United States Patent
Suzuki et al.

(10) Patent No.: US 9,926,864 B2
(45) Date of Patent: Mar. 27, 2018

(54) CONTROL SYSTEM AND CONTROL METHOD FOR INTERNAL COMBUSTION ENGINE

(71) Applicant: TOYOTA JIDOSHA KABUSHIKI KAISHA, Toyota-shi, Aichi (JP)

(72) Inventors: Naoki Suzuki, Hadano (JP); Satoshi Taniguchi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/115,100

(22) PCT Filed: Jan. 28, 2015

(86) PCT No.: PCT/IB2015/000085
§ 371 (c)(1),
(2) Date: Jul. 28, 2016

(87) PCT Pub. No.: WO2015/114444
PCT Pub. Date: Aug. 6, 2015

(65) Prior Publication Data
US 2017/0009680 A1    Jan. 12, 2017

(30) Foreign Application Priority Data

Jan. 31, 2014  (JP) .................................. 2014-016902

(51) Int. Cl.
*F02D 41/00* (2006.01)
*F02D 19/06* (2006.01)
(Continued)

(52) U.S. Cl.
CPC ..... *F02D 41/0027* (2013.01); *F02D 19/0615* (2013.01); *F02D 19/0636* (2013.01);
(Continued)

(58) Field of Classification Search
CPC ............ F02D 41/0027; F02D 41/0025; F02D 19/0615; F02D 19/0636; F02D 19/0647;
(Continued)

(56) References Cited

U.S. PATENT DOCUMENTS

| | | |
|---|---|---|
| 2010/0031941 A1 | 2/2010 | Hokuto |
| 2012/0029788 A1 | 2/2012 | Shinoda |

(Continued)

FOREIGN PATENT DOCUMENTS

| | | |
|---|---|---|
| JP | 60047837 A | 3/1985 |
| JP | 2000-291471 A | 10/2000 |

(Continued)

*Primary Examiner* — Mahmoud Gimie
(74) *Attorney, Agent, or Firm* — Andrews Kurth Kenyon LLP

(57) ABSTRACT

In a control system for an internal combustion engine that can use a plurality of kinds of fuel including compressed natural gas, the invention prohibits a changeover from CNG to another fuel from being made in a period from a time when CNG is used for the first time after the start of the internal combustion engine to a time when it is determined that properties of CNG do not need to be learned, or a period from the time when CNG is used for the first time after the start of the internal combustion engine to a time when a processing of learning the properties of CNG ends.

5 Claims, 6 Drawing Sheets

(51) Int. Cl.
*F02D 19/08* (2006.01)
*F02D 41/14* (2006.01)
*F02D 41/26* (2006.01)
*F02D 41/30* (2006.01)
*F02M 21/02* (2006.01)
*F02D 41/24* (2006.01)

(52) U.S. Cl.
CPC ...... *F02D 19/0647* (2013.01); *F02D 19/0692* (2013.01); *F02D 19/081* (2013.01); *F02D 41/0025* (2013.01); *F02D 41/1454* (2013.01); *F02D 41/26* (2013.01); *F02D 41/3005* (2013.01); *F02M 21/0215* (2013.01); *F02D 19/0628* (2013.01); *F02D 41/2451* (2013.01); *F02D 2200/0611* (2013.01); *Y02T 10/36* (2013.01)

(58) Field of Classification Search
CPC .............. F02D 19/081; F02D 19/0692; F02M 21/0215

USPC .... 701/103, 104, 107; 123/1 A, 27 GE, 525, 123/575

See application file for complete search history.

(56) References Cited

U.S. PATENT DOCUMENTS

| | | |
|---|---|---|
| 2014/0303876 A1 | 10/2014 | Taniguchi et al. |
| 2015/0034061 A1 | 2/2015 | Masubuchi et al. |

FOREIGN PATENT DOCUMENTS

| | | | |
|---|---|---|---|
| JP | 2008031915 A | * | 2/2008 |
| JP | 2008144723 A | | 6/2008 |
| JP | 2013130156 A | | 7/2013 |
| WO | 2013/076811 A1 | | 5/2013 |
| WO | 2013118276 A1 | | 8/2013 |

* cited by examiner

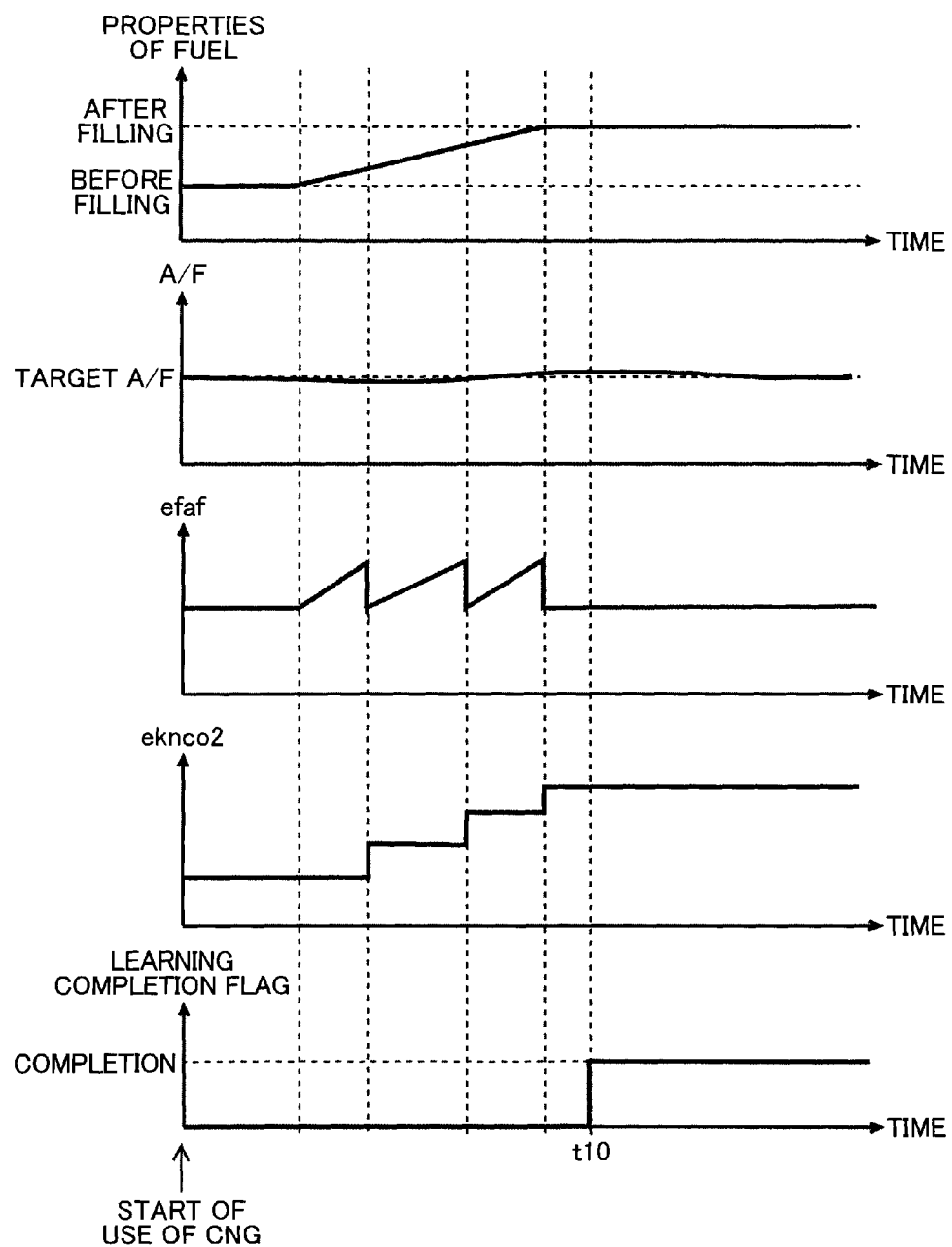

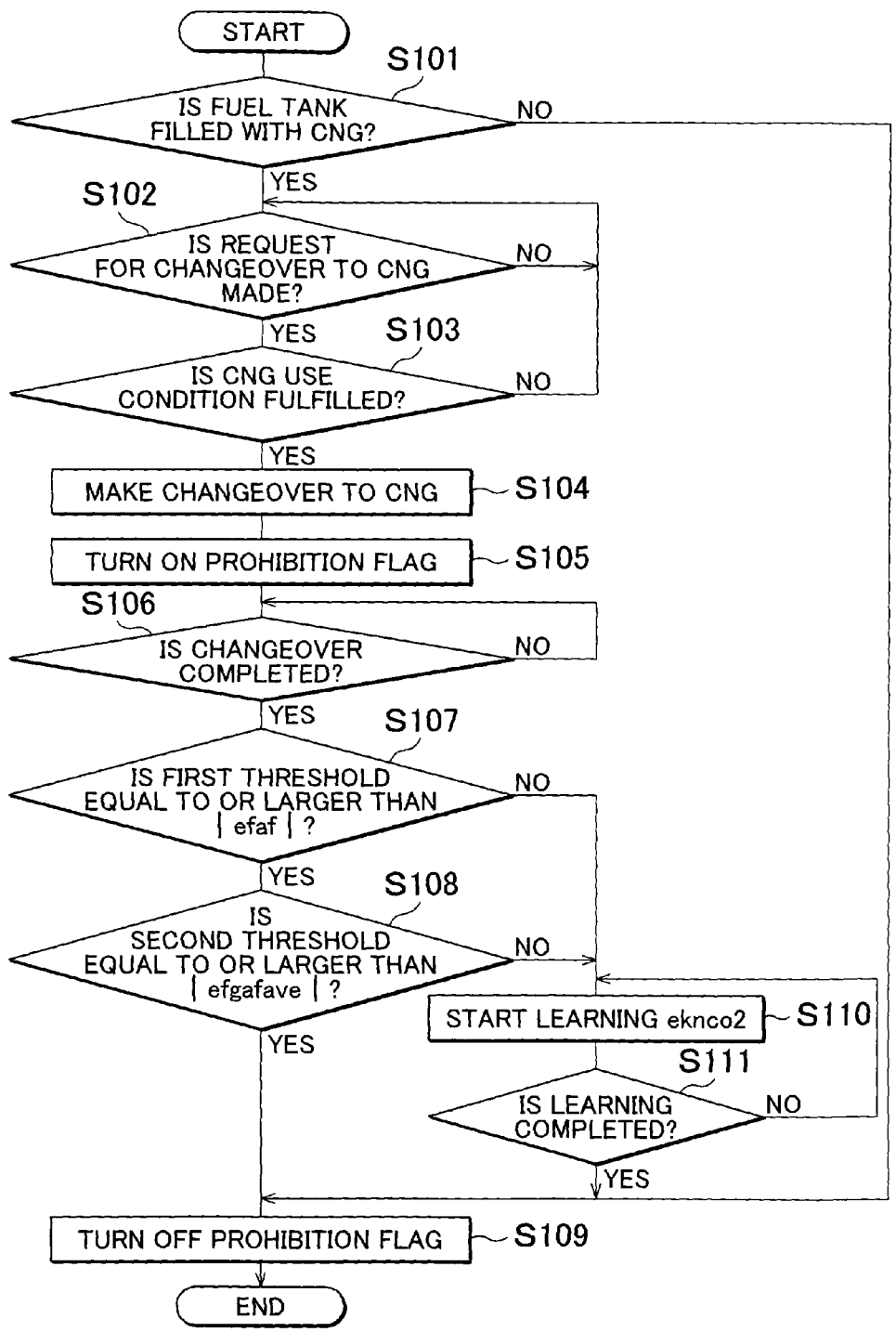

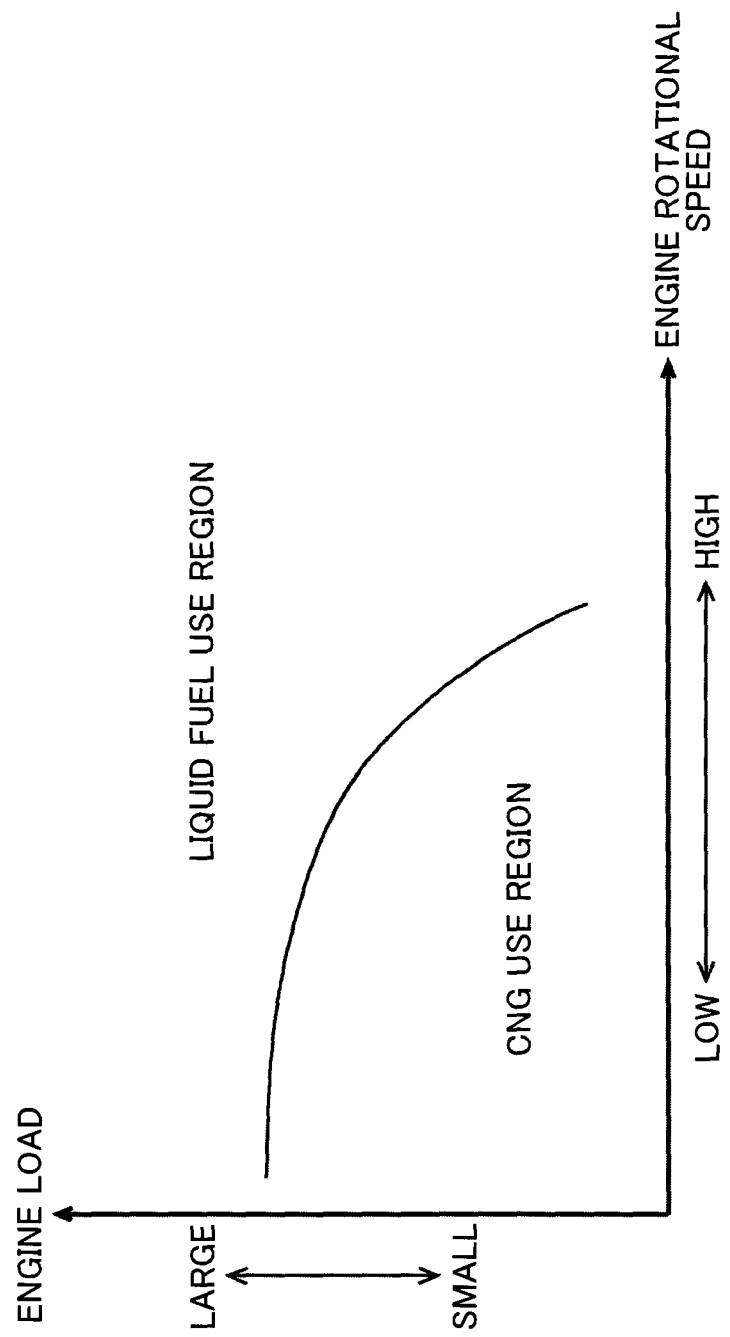

CONTROL SYSTEM AND CONTROL METHOD FOR INTERNAL COMBUSTION ENGINE

CROSS-REFERENCE TO RELATED APPLICATIONS

This is a national phase application based on the PCT International Patent Application No. PCT/IB2015/000085 filed Jan. 28, 2015, claiming priority to Japanese Patent Application No. 2014-016902 filed Jan. 31, 2014, the entire contents of both of which are incorporated herein by reference.

BACKGROUND OF THE INVENTION

1. Field of the Invention

The invention relates to a control system and a control method for an internal combustion engine that can use a plurality of kinds of fuel including compressed natural gas (CNG).

2. Description of Related Art

In recent years, internal combustion engines that are operated using CNG as fuel have been known. In such an internal combustion engine, there has been proposed an art of determining that the properties of CNG have changed when the correction amount of air-fuel ratio feedback control is larger than a threshold when the internal combustion engine is first operated after being replenished with CNG, and learning the properties of CNG (e.g., see WO 2013/076811).

SUMMARY OF THE INVENTION

By the way, in an internal combustion engine that can use a plurality of kinds of fuel including CNG and other kinds of fuel (e.g., gasoline, light oil and the like), a request for a changeover to another fuel may be made while the properties of CNG are learned. In such a case, when a changeover from CNG to another fuel is permitted, the air-fuel ratio of the mixture may deviate from an air-fuel ratio suited for the properties of CNG when a changeover from that fuel again to CNG is made. As a result, a deterioration in driveability or a deterioration in exhaust emission properties may be caused.

It is an object of the invention to restrain, to the maximum possible extent, the driveability and the exhaust emission properties from deteriorating as a result of a change in the properties of CNG in a control system and a control method for an internal combustion engine that can use a plurality of kinds of fuel including CNG.

According to a first aspect of the invention, there is provided a control system for an internal combustion engine that can use a plurality of kinds of fuel including compressed natural gas. In this control system for the internal combustion engine, a changeover from compressed natural gas to another fuel is prohibited from being made in a period from a time when compressed natural gas is used for the first time after start of the internal combustion engine to a time when a processing of learning properties of compressed natural gas ends.

More specifically, according to the first aspect of the invention, there is provided a control system for an internal combustion engine that can use a plurality of kinds of fuel including compressed natural gas. This control system is equipped with determination means, learning means, and prohibition means. The determination means determines whether or not properties of the compressed natural gas need to be learned. The learning means executes a learning processing for learning the properties of the compressed natural gas when the determination means determines that the properties of the compressed natural gas need to be learned. The prohibition means prohibits a changeover from the compressed natural gas to another fuel from being made in a period from a time when the compressed natural gas is used for a first time after start of the internal combustion engine to a time when the determination means determines that the properties of the compressed natural gas do not need to be learned, or in a period from the time when the compressed natural gas is used for the first time after the start of the internal combustion engine to a time when the learning processing is completed after the determination means determines that the properties of the compressed natural gas need to be learned.

The properties of compressed natural gas (CNG) are not necessarily uniform, and may differ depending on the location for replenishment of CNG (the filling location). When a fuel tank is replenished (filled) with CNG, the CNG remaining in the fuel tank (hereinafter referred to as "residual CNG") and the CNG with which the fuel tank is filled (hereinafter referred to as "filling CNG") mix with each other. In the case where the properties of filling CNG are different from the properties of residual CNG, the properties of the CNG that is supplied from the fuel tank to the internal combustion engine after the fuel tank is filled with filling fuel (CNG as a mixture of filling CNG and residual CNG (hereinafter referred to as "mixed CNG")) are different from the properties of residual CNG.

It should be noted herein that examples of the influence of a change in the properties of CNG on the operating state of the internal combustion engine include include a change in the theoretical air-fuel ratio, a change in Wobbe index (a value obtained by dividing the gross heating value of CNG by the square root of the specific gravity of CNG) and the like. For example, when the concentration of the inert gas (e.g., carbon dioxide ($CO_2$) or nitrogen ($N_2$)) contained in gaseous fuel changes, the air-fuel ratio (the theoretical air-fuel ratio) at which CNG and oxygen in the mixture react with each other in just proportions changes, and the Wobbe index changes.

In consequence, when the internal combustion engine is operated based on the properties of residual CNG when being operated by mixed CNG, the air-fuel ratio of the mixture does not become equal to a desired air-fuel ratio. As a result, a deterioration in driveability or a deterioration in exhaust emission properties may be caused. In consequence, the internal combustion engine needs to be operated based on the properties of mixed CNG in the case where the properties of CNG have changed.

The properties of CNG can change when CNG is replenished. Then, CNG is replenished before the start of the internal combustion engine (during the stoppage of the operation of the internal combustion engine). In consequence, the properties of CNG may change when CNG is used for the first time after the start of the internal combustion engine.

In contrast, the control system for the internal combustion engine according to the first aspect of the invention determines whether or not the properties of CNG need to be learned, when CNG is used for the first time after the start of the internal combustion engine. In other words, the control system for the internal combustion engine according to the invention determines whether or not the properties of CNG have changed when CNG is used for the first time after the start of the internal combustion engine.

When the properties of CNG need to be learned, the processing of learning the properties of CNG (the learning processing) is executed. "The learning processing" mentioned herein is, for example, a process of obtaining a correction value for correcting a control parameter regarding the air-fuel ratio of the mixture (e.g., a fuel injection amount, an intake air amount, an EGR gas amount or the like) to a value suited for the properties of CNG, or a learning value.

By the way, a request for a changeover from CNG to another fuel may be be made before the determination as to whether or not the properties of CNG need to be learned ends, or before the learning processing for learning the properties of CNG ends. When a changeover from CNG to another fuel is permitted in such a case, the air-fuel ratio of the mixture does not become equal to the desired air-fuel ratio when a changeover from that fuel again to CNG is made. As a result, a deterioration in driveability or a deterioration in exhaust emission properties is caused.

In contrast, the control system for the internal combustion engine according to the first aspect of the invention prohibits a changeover from compressed natural gas to another fuel from being made in the period from the time when compressed natural gas is used for the first time after the start of the internal combustion engine to the time when the determination means determines that the properties of compressed natural gas do not need to be learned, or the period from the time when compressed natural gas is used for the first time after the start of the internal combustion engine to the time when the learning processing is completed after the determination means determines that the properties of compressed natural gas need to be learned.

According to this configuration, a changeover from CNG to another fuel is made after it is determined that the properties of CNG do not need to be learned or after the learning processing for learning the properties of CNG ends. As a result, the air-fuel ratio of the mixture can be made equal to the desired air-fuel ratio when a changeover from CNG to another fuel is made and then a changeover from that fuel again to CNG is made. As a result, a deterioration in driveability or a deterioration in exhaust emission properties can be restrained from being caused as a result of changes in the properties of CNG.

The control system for the internal combustion engine may be further equipped with detection means for detecting an air-fuel ratio of exhaust gas discharged from the internal combustion engine, and control means for executing feedback control of a fuel injection amount based on a difference between the air-fuel ratio detected by the detection means and a target air-fuel ratio.

In that case, the determination means may determine that the properties of the compressed natural gas do not need to be learned when a correction amount for the fuel injection amount through the feedback control is equal to or smaller than a threshold when the compressed natural gas is used for the first time after the start of the internal combustion engine, and may determine that the properties of the compressed natural gas need to be learned when the correction amount is larger than the threshold when the compressed natural gas is used for the first time after the start of the internal combustion engine.

A change in the properties of CNG, in other words, a change in the concentration of inert gas in CNG is reflected by the correction amount for the fuel injection amount through feedback control. More specifically, when the theoretical air-fuel ratio changes due to a change in the properties of CNG, the air-fuel ratio of exhaust gas (the concentration of oxygen) changes correspondingly. Therefore, when the properties of CNG (the concentration of inert gas) change through replenishment of CNG, the air-fuel ratio of exhaust gas detected by the detection means changes, so the correction amount through feedback control changes as well.

For example, when filling CNG that is higher in the concentration of inert gas than residual CNG is replenished, the concentration of inert gas in mixed CNG becomes higher than the concentration of inert gas in residual CNG. In that case, the theoretical air-fuel ratio of mixed CNG becomes lower (richer) than the theoretical air-fuel ratio of residual CNG. As a result, the air-fuel ratio of exhaust gas detected by the detection means deviates from the target air-fuel ratio toward the lean side. In consequence, the correction amount based on feedback control becomes a value for increasing the fuel injection amount. The magnitude of the correction amount becomes larger than a maximum value that can be assumed by the correction amount when the properties of CNG are constant.

When filling CNG that is lower in the concentration of inert gas than residual CNG is replenished, the concentration of inert gas in mixed CNG becomes lower than the concentration of inert gas in residual CNG. In that case, the theoretical air-fuel ratio of mixed CNG becomes higher (leaner) than the theoretical air-fuel ratio of residual CNG. As a result, the air-fuel ratio of exhaust gas detected by the detection means deviates from the target air-fuel ratio toward the rich side. In consequence, the correction amount based on feedback control becomes a value for reducing the fuel injection amount. The magnitude of the fuel injection amount becomes larger than a maximum value that can be assumed by the correction amount when the properties of CNG are constant.

Accordingly, when the correction amount based on feedback control is larger than a threshold, it can be determined that the properties of CNG have changed. Incidentally, "the threshold" mentioned herein is a value that is obtained by adding a margin to the maximum value that can be assumed by the correction value based on feedback control, for example, under condition that the properties of CNG be constant.

In the control system for the internal combustion engine, the determination means may further execute a processing of determining whether or not the compressed natural gas has been replenished before the start of the internal combustion engine. Then, the determination means may determine, based on the correction amount for the fuel injection amount through the feedback control, whether or not the properties of the compressed natural gas need to be learned, when the determination means determines that the compressed natural gas has been replenished before the start of the internal combustion engine, and may determine that the properties of the compressed natural gas do not need to be learned, when the determination means determines that the compressed natural gas has not been replenished before the start of the internal combustion engine.

As described above, the properties of CNG can change when CNG is replenished. In consequence, the properties of CNG have not changed unless CNG is replenished before the start of the internal combustion engine (during the stoppage of the operation of the internal combustion engine). Therefore, if CNG has not been replenished before the start of the internal combustion engine, there is no need to execute the processing of determining, based on the correction amount based on feedback control, whether or not the properties of compressed natural gas need to be learned, and the learning processing for learning the properties of CNG. As a result, there is no need to prohibit a changeover from CNG to another fuel from being made either. In consequence, the changeover from CNG to another fuel can be made at a desired timing.

The control system for the internal combustion engine can also be applied to an internal combustion engine that makes a changeover in the fuel in use when a driver inputs a request for a changeover in the fuel in use. For example, the prohibition means may refrain from changing over the fuel until one of two period ends when the request for the changeover of the fuel in use is input during one of the two periods. The two periods may be (i) the period from the time when the compressed natural gas is used for the first time after the start of the internal combustion engine to the time when the determination means determines that the properties of the compressed natural gas do not need to be learned, and (ii) the period from the time when the compressed natural gas is used for the first time after the start of the internal combustion engine to the time when the learning processing is completed after the determination means determines that the properties of the compressed natural gas need to be learned.

The control system for the internal combustion engine can also be applied to an internal combustion engine that has an operating region divided into a CNG use region and a region for the use of another fuel, and that makes a changeover in fuel depending on those regions. For example, the prohibition means may refrain from changing over the fuel until one of the period from the time when the compressed natural gas is used for the first time after the start of the internal combustion engine to the time when the determination means determines that the properties of the compressed natural gas do not need to be learned, and the period from the time when the compressed natural gas is used for the first time after the start of the internal combustion engine to the time when the learning processing is completed after the determination means determines that the properties of the compressed natural gas need to be learned ends, when the operating state of the internal combustion engine shifts from the CNG use region to the region for the use of another fuel during one of the two periods.

A second aspect of the invention is a control system for an internal combustion engine that can use a plurality of kinds of fuel including compressed natural gas. The control system includes an electronic control unit. The electronic control unit is configured to (i) determine whether or not properties of the compressed natural gas need to be learned, (ii) execute a learning processing, that is, a processing of learning the properties of the compressed natural gas when the electronic control unit determines that the properties of the compressed natural gas need to be learned, and (iii) prohibit a changeover from the compressed natural gas to another fuel from being made in a first period or a second period. The first period is a period from a time when the compressed natural gas is used for a first time after the start of the internal combustion engine to a time when the electronic control unit determines that the properties of the compressed natural gas do not need to be learned. The second period is a period from the time when the compressed natural gas is used for the first time after the start of the internal combustion engine to a time when the learning processing that is executed after the electronic control unit determines that the properties of the compressed natural gas need to be learned is completed.

A third aspect of the invention is a control method for an internal combustion engine that can use a plurality of kinds of fuel including compressed natural gas. The control method includes (i) determining whether or not properties of the compressed natural gas need to be learned, (ii) executing a learning processing, that is, a processing of learning the properties of the compressed natural gas when it is determined that the properties of the compressed natural gas need to be learned, and (iii) prohibiting a changeover from the compressed natural gas to another fuel from being made in a first period or a second period. The first period is a period from a time when the compressed natural gas is used for a first time after the start of the internal combustion engine to a time when it is determined that the properties of the compressed natural gas do not need to be learned. The second period is a period from the time when the compressed natural gas is used for the first time after the start of the internal combustion engine to a time when the learning processing that is executed after it is determined that the properties of the compressed natural gas need to be learned is completed.

According to the invention, the driveability and the exhaust emission properties can be restrained, to the maximum possible extent, from deteriorating as a result of a change in the properties of CNG in a control system for an internal combustion engine that can use a plurality of kinds of fuel including CNG

BRIEF DESCRIPTION OF THE DRAWINGS

Features, advantages, and technical and industrial significance of one exemplary embodiment of the invention will be described below with reference to the accompanying drawings, in which like numerals denote like elements, and wherein:

FIG. 4 includes timing charts showing how the air-fuel ratio (A/F) changes with time in the case where a changeover from CNG to another fuel is prohibited from being made until the learning processing ends;

FIG. 5 is a flowchart showing a processing routine that is executed by an ECU when an internal combustion engine is started; and FIG. 6 is a view showing an example in which the operating region of the internal combustion engine is divided into a CNG use region and a liquid fuel use region.

DETAILED DESCRIPTION OF EMBODIMENT

A specific embodiment of the invention will be described hereinafter based on the drawings. The dimensions, materials, shapes, relative arrangements and the like of components mentioned in the present embodiment of the invention are not intended to limit the technical scope of the invention thereto unless otherwise specified.

Figure 1:
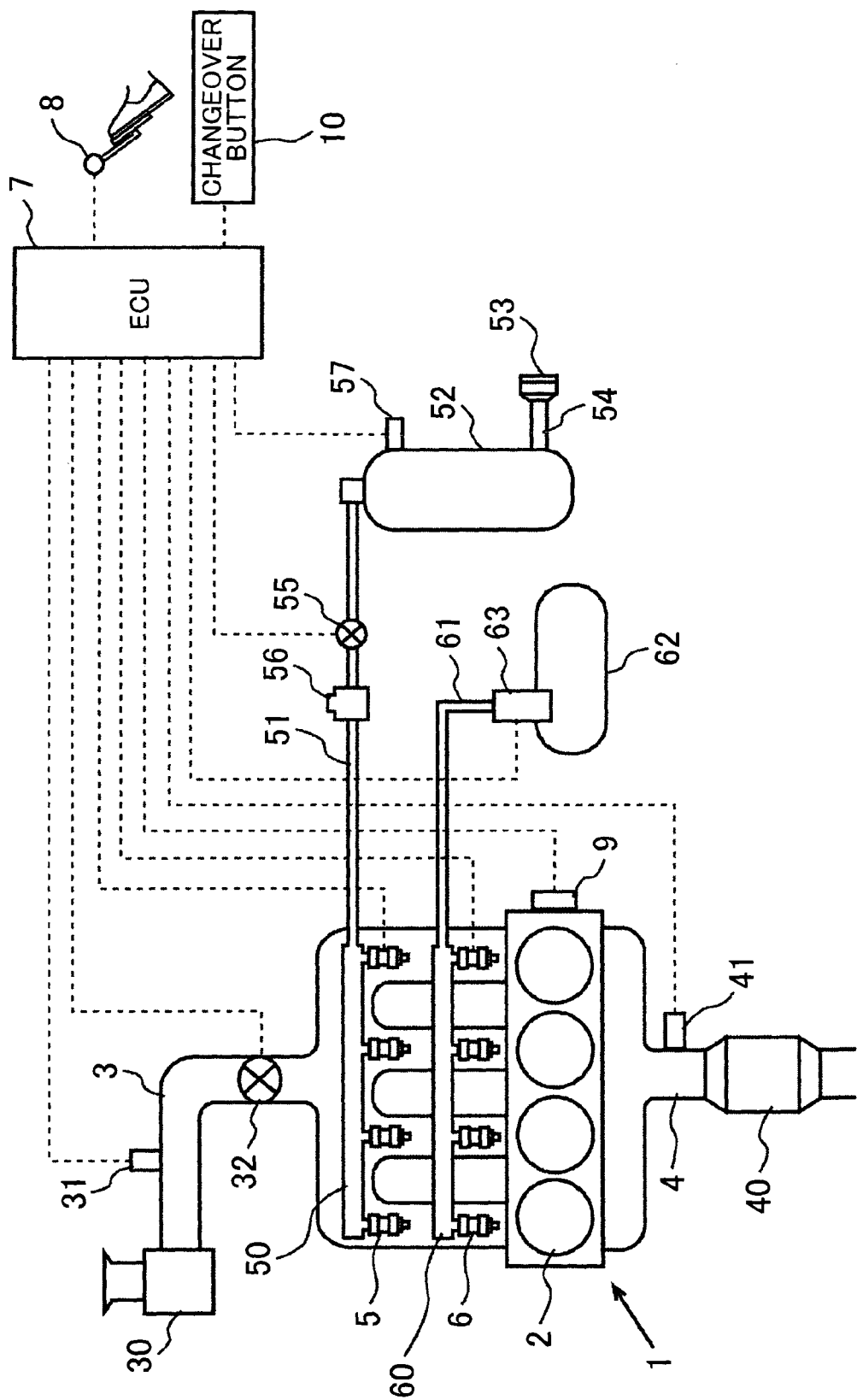
FIG. 1 is a view showing an overall configuration of a vehicle to which the invention is applied.

FIG. 1 is a view showing an overall configuration of an internal combustion engine to which the invention is applied. An internal combustion engine 1 shown in FIG. 1 is a spark ignition-type internal combustion engine that can use CNG and liquid fuel (gasoline, alcohol fuel and the like).

Incidentally, the internal combustion engine 1 may be a compression ignition-type internal combustion engine that can use CNG and light oil.

An intake passage 3 and an exhaust passage 4 are connected to the internal combustion engine 1. The intake passage 3 is a passage for introducing the fresh air (air) taken in from the atmosphere into respective cylinders 2. The intake passage 3 is mounted, except at both ends thereof, with an air cleaner 30. The air cleaner 30 collects the dust, dirt and the like contained in air. An airflow meter 31 is attached to the intake passage 3 downstream of the air cleaner 30. The airflow meter 31 outputs an electric signal related to an amount (a mass) of air flowing through the intake passage 3. A throttle valve 32 is attached to the intake passage 3 downstream of the airflow meter 31. The throttle valve 32 changes the amount of air supplied to the internal combustion engine 1 by changing the passage cross-sectional area of the intake passage 3.

Incidentally, the intake passage 3 downstream of the throttle valve 32 is divided into four branch pipes, which are connected to the cylinders 2 respectively. The branch pipes of the intake passage 3 are mounted with first fuel injection valves 5 that inject CNG into the branch pipes respectively, and second fuel injection valves 6 that inject liquid fuel into the branch pipes respectively.

The first fuel injection valves 5 are connected to a first delivery pipe 50. The first delivery pipe 50 is connected to a first fuel tank 52 via a first fuel passage 51. The first fuel tank 52 is connected to a filling port 53 that is attached to a vehicle body of a vehicle, via an inlet pipe 54. The filling port 53 opens when a filling nozzle disposed at a gas station or the like is inserted thereinto, and introduces into the inlet pipe 54 the CNG supplied from the filling nozzle. The CNG introduced into the inlet pipe 54 from the filling port 53 is stored in the first fuel tank 52.

The CNG stored in the first fuel tank 52 is supplied to the first delivery pipe 50 via the first fuel passage 51, and then is distributed to the four first fuel injection valves 5 from the first delivery pipe 50. Incidentally, a shutoff valve 55 is arranged in the first fuel passage 51 except at both ends thereof. The shutoff valve 55 makes a changeover between conduction and shutoff of the first fuel passage 51. The shutoff valve 55 is closed during the stoppage of the operation of the internal combustion engine 1 (e.g., during a period in which an ignition switch is off), and is open during the operation of the internal combustion engine 1 (e.g., during a period in which the ignition switch is on). As the shutoff valve 55, it is possible to employ, for example, an electromagnetic valve gear that opens when a driving electric power is applied thereto, and that closes when no driving electric power is applied thereto.

A regulator 56 is arranged in the first fuel passage 51 downstream of the shutoff valve 55. The regulator 56 reduces the pressure of the CNG supplied from the first fuel tank 52 to a preset pressure (a set pressure). In other words, the regulator 56 is a valve gear that adjusts the passage cross-sectional area of the first fuel passage 51 such that a fuel pressure in the first fuel passage 51 downstream of the regulator 56, in other words, a fuel pressure applied to the first fuel injection valves 5 and the first delivery pipe 50 (hereinafter referred to as "a fuel injection pressure") becomes equal to the set pressure. As the regulator 56, it is possible to employ, for example, a mechanical valve gear that is fabricated by combining a diaphragm and a spring with each other. Besides, a pressure sensor 57 is attached to the first fuel tank 52. The pressure sensor 57 outputs an electric signal associated with the pressure in the first fuel tank 52.

The second fuel injection valves 6 are connected to a second delivery pipe 60. The second delivery pipe 60 is connected to a second fuel tank 62 via a second fuel passage 61. The second fuel tank 62 is a tank that stores liquid fuel. A fuel pump 63 for pumping up the liquid fuel stored in the second fuel tank 62 is attached to the second fuel passage 61 except at both ends thereof. The fuel pump 63 is, for example, a turbine-type pump that is driven by an electric motor. The liquid fuel pumped up by the fuel pump 63 is supplied to the second delivery pipe 60 via the second fuel passage 61, and then is distributed to the four fuel injection valves 6 from the second delivery pipe 60.

The exhaust passage 4 is a passage for discharging the burned gas (exhaust gas) discharged from the respective cylinders 2, into the atmospheric via an exhaust gas control apparatus 40, a muffler and the like. An A/F sensor 41 (air-fuel ratio sensor) that outputs an electric signal associated with the air-fuel ratio is attached to the exhaust passage 4 except at both ends thereof.

The internal combustion engine 1 thus configured is mounted with an ECU 7. The ECU 7 is an electronic control unit that is constituted of a CPU, a ROM, a RAM, a backup RAM and the like. In addition to the aforementioned airflow meter 31, the aforementioned A/F sensor 41, and the aforementioned pressure sensor 57, various sensors such as an accelerator position sensor 8, a crank position sensor 9, a changeover button 10 and the like are electrically connected to the ECU 7. Incidentally, the accelerator position sensor 8 is a sensor that outputs an electric signal associated with an operation amount of an accelerator pedal (an accelerator opening degree). The crank position sensor 9 is a sensor that outputs an electric signal associated with a rotational position of a crankshaft of the internal combustion engine 1. The changeover button 10 is a device that is provided in a cabin of the vehicle to allow a driver to input a request for a changeover of the fuel in use. The changeover button 10 is regarded as an input device.

Various components such as the first fuel injection valves 5, the second fuel injection valves 6, the throttle valve 32, the shutoff valve 55, the fuel pump 63 and the like are electrically connected to the ECU 7. The ECU 7 controls the various components based on output signals of the aforementioned various sensors.

For example, the ECU 7 calculates an operating condition of the internal combustion engine 1 (e.g., an engine load, an engine rotational speed and the like) based on output signals of the aforementioned various sensors, and obtains control parameters (e.g., a fuel injection amount, an intake air amount, an ignition timing and the like) regarding a combustion state of the mixture, based on the operating condition. Then, the ECU 7 controls the various components in accordance with the control parameters. Besides, the ECU 7 makes a changeover of the fuel in use, when the driver operates the changeover button 10 (when a request for a changeover is input).

By the way, the properties of the CNG stored in the first fuel tank 52 are not necessarily uniform, and may differ depending on the location for replenishment of CNG (the filling location) or the like. The air-fuel ratio (the theoretical air-fuel ratio) at the time when the CNG and oxygen in the mixture react with each other in just proportions differs depending on the properties of CNG. In particular, a difference in the concentration of the inert gas contained in CNG (carbon dioxide ($CO_2$) and nitrogen ($N_2$)) leads to a difference in the theoretical air-fuel ratio as well.

Figure 2:
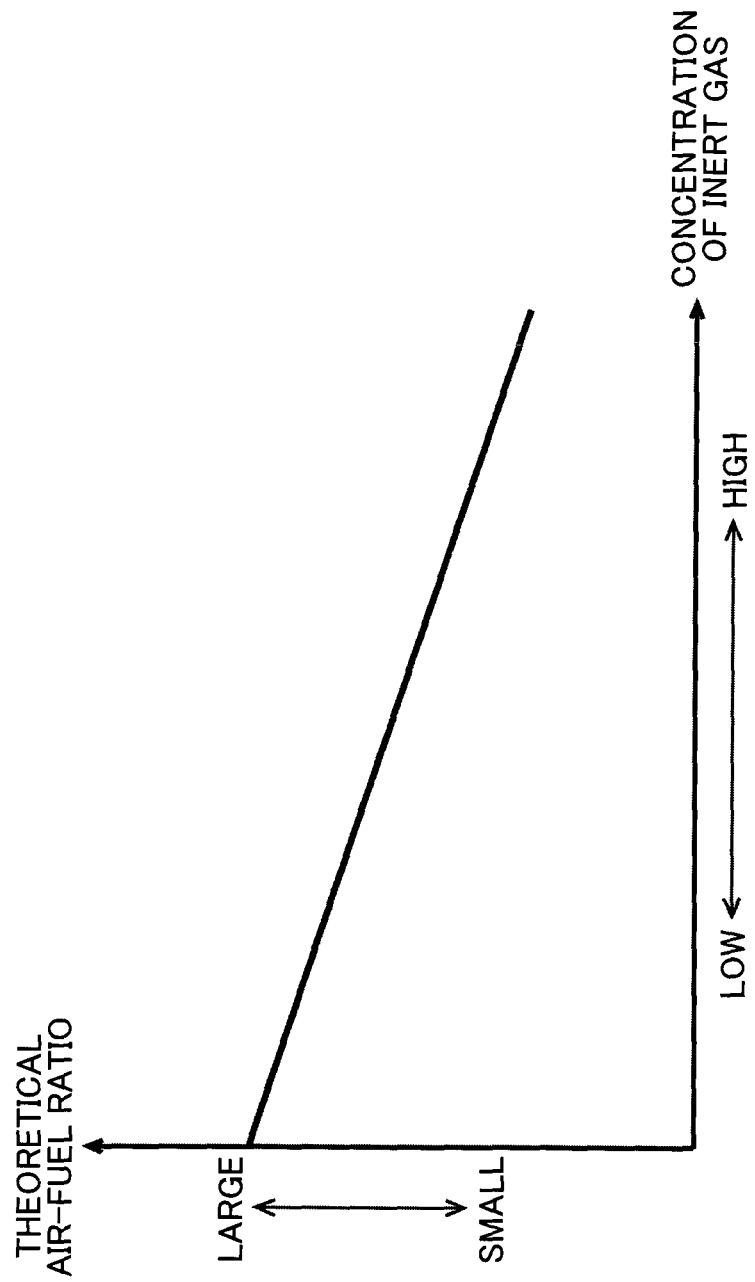
FIG. 2 is a view showing a relationship between the concentration of inert gas contained in CNG and the theoretical air-fuel ratio.

It should be noted herein that FIG. 2 shows a relationship between the concentration of the inert gas contained in CNG and the theoretical air-fuel ratio. In FIG. 2, the theoretical air-fuel ratio of CNG is lower when the concentration of inert gas in CNG is high than when the concentration of inert gas in CNG is low. Therefore, if the post-filling control parameters are controlled in accordance with the theoretical air-fuel ratio of residual CNG when the first fuel tank 52 is filled with the CNG (filling CNG) that is different in properties from the CNG (residual CNG) remaining in the first fuel tank 52, the actual air-fuel ratio may become different from a desired target air-fuel ratio, or the torque generated by the internal combustion engine 1 may become different from a target torque.

For example, when the first fuel tank 52 is filled with filling CNG that is higher in the concentration of inert gas than residual CNG, the theoretical air-fuel ratio of post-filling CNG (CNG as a mixture of residual CNG and filling CNG (mixed CNG)) becomes lower (richer) than the theoretical air-fuel ratio of residual CNG. Therefore, when the control parameters after the filling with filling CNG are controlled in accordance with the theoretical air-fuel ratio of residual CNG, the actual air-fuel ratio becomes higher (leaner) than a target air-fuel ratio.

On the other hand, when the first fuel tank 52 is filled with filling CNG that is lower in the concentration of inert gas than residual CNG, the theoretical air-fuel ratio of mixed CNG becomes higher (leaner) than the theoretical air-fuel ratio of residual CNG. Therefore, when the control parameters after the filling with filling CNG are controlled in accordance with the theoretical air-fuel ratio of residual CNG, the actual air-fuel ratio becomes lower (richer) than the target air-fuel ratio.

Accordingly, in the case where the properties of CNG (the concentration of inert gas) have changed, it is necessary to learn the properties of CNG in order to compensate for a change in the theoretical air-fuel ratio. More specifically, the control parameters regarding the air-fuel ratio of the mixture need to be corrected to values suited for the properties of CNG. An example of correcting the fuel injection amount will be described hereinafter.

First of all, in the present embodiment of the invention, when the internal combustion engine 1 is operated using CNG, a fuel injection amount (a fuel injection time) etau of CNG is calculated through the use of an equation (1) shown below.

$$etau = etp * ekaf * ekin * k \quad (1)$$

The etp in the equation (1) is a base injection amount that is derived from a map that adopts an intake air amount, an engine rotational speed and the like as arguments. The map mentioned herein is obtained through an adaptation processing that utilizes a preliminary experiment or the like, and is stored in the ROM of the ECU 7.

The ekaf in the equation (1) is a correction coefficient (an air-fuel ratio feedback correction coefficient) for eliminating a deviation between the target air-fuel ratio and an actual air-fuel ratio (an air-fuel ratio detected by the A/F sensor 41). This ekaf is calculated, for example, according to an equation (2) shown below.

$$ekaf = (efaf + efgaf + 100)/100 \quad (2)$$

The efaf in the equation (2) is a correction value (an air-fuel ratio feedback correction value) that is determined based on a difference between the target air-fuel ratio and the actual air-fuel ratio. The efgaf in the equation (2) is an air-fuel ratio learning value for compensating for a persistent deviation between the target air-fuel ratio and the actual air-fuel ratio (a deviation resulting from time-dependent changes in the injection characteristics of the first fuel injection valves 5 and the like).

The k in the equation (1) is an increasing correction coefficient that is determined in accordance with a coolant temperature or an accelerator opening degree. Besides, the ekin in the equation (1) is a correction coefficient (an inert gas concentration learning correction coefficient) for compensating for a change in the theoretical air-fuel ratio resulting from a change in the properties of CNG (a change in the concentration of inert gas).

The inert gas concentration learning correction coefficient ekin is calculated based on an equation (3) shown below.

$$ekin = (eknco2 + 100)/100 \quad (3)$$

The eknco2 in the equation (3) is a learning value (an inert gas concentration learning value) for compensating for a persistent deviation between the target air-fuel ratio and the actual air-fuel ratio, which results from the concentration of inert gas in CNG. A method of determining the inert gas concentration learning value eknco2 will be described hereinafter.

The properties of CNG change when the first fuel tank 52 is replenished with CNG. For example, when the first fuel tank 52 is replenished with filling CNG that is higher in the concentration of inert gas than residual CNG, the concentration of inert gas in mixed CNG becomes higher than the concentration of inert gas in residual CNG. Besides, when the first fuel tank 52 is replenished with filling CNG that is lower in the concentration of inert gas than residual CNG, the concentration of inert gas in mixed CNG becomes lower than the concentration of inert gas in residual CNG.

The change in the properties of mixed CNG is reflected by the air-fuel ratio feedback correction value efaf when CNG is used for the first time after the filling with filling CNG. For example, when the first fuel tank 52 is replenished with filling CNG that is higher in the concentration of inert gas than residual CNG, the theoretical air-fuel ratio of mixed CNG becomes lower (richer) than the theoretical air-fuel ratio of residual CNG. Therefore, the air-fuel ratio detected by the A/F sensor 41 deviates from the target air-fuel ratio toward the lean side. In that case, the air-fuel ratio feedback correction value efaf becomes a value (a positive value) for increasing the fuel injection amount. The magnitude of the air-fuel ratio feedback correction value efaf becomes larger than a maximum value that can be assumed by the correction value when the properties of CNG are constant.

On the other hand, when the first fuel tank 52 is replenished with filling CNG that is lower in the concentration of inert gas than residual CNG, the theoretical air-fuel ratio of mixed CNG becomes higher (leaner) than the theoretical air-fuel ratio of residual CNG. Therefore, the air-fuel ratio detected by the A/F sensor 41 deviates from the target air-fuel ratio toward the rich side. In that case, the air-fuel ratio feedback correction value efaf becomes a value (a negative value) for reducing the fuel injection amount. The magnitude of the air-fuel ratio feedback correction value efaf becomes larger than a maximum value that can be assumed by the correction value when the properties of CNG are constant.

Incidentally, the filling with CNG is carried out before the start of the internal combustion engine 1 (during the stoppage of the operation of the internal combustion engine 1). In consequence, if the magnitude of the air-fuel ratio feedback correction value efaf is equal to or larger than a threshold when CNG is used for the first time after the start of the internal combustion engine 1, the first fuel tank 52 can be regarded as having been filled with filling CNG that is different in properties from residual CNG. Incidentally, "the threshold" mentioned herein is, for example, a value that is obtained by adding a margin to a maximum value that can be assumed by the absolute value of the air-fuel ratio feedback correction value efaf under condition that the properties of CNG be constant.

Thus, if the magnitude of the air-fuel ratio feedback correction value efaf is equal to or larger than the threshold when CNG is used for the first time after the start of the internal combustion engine 1, the ECU 7 executes a processing for learning the properties of CNG (a learning processing). The learning processing mentioned herein is a processing of updating the the inert gas concentration learning value eknco2 to a value suited for the properties of CNG.

More specifically, the ECU 7 adds a predetermined value a to the inert gas concentration learning value eknco2. The predetermined value a is set to a positive value when the air-fuel ratio feedback correction value efaf is a positive value, and is set to a negative value when the air-fuel ratio feedback correction value efaf is a negative value. Incidentally, the magnitude of the predetermined value a may be a variable value that is determined in accordance with the magnitude of the air-fuel ratio feedback correction value efaf (or a difference between the absolute value of the air-fuel ratio feedback correction value efaf and the threshold), or may be a fixed value that is determined through an adaptation processing that utilizes a preliminary experiment or the like.

When the inert gas concentration learning value eknco2 is updated, the ECU 7 subtracts an update value (the predetermined value a) of the inert gas concentration learning value eknco2 from the air-fuel ratio feedback correction value efaf. This is because a correction value resulting from a change in the properties of CNG is included in both the inert gas concentration learning value eknco2 and the air-fuel ratio feedback correction value efaf.

Incidentally, the processing of learning the inert gas concentration learning value eknco2 is executed with higher priority than the processing of learning the air-fuel ratio learning value efgaf. This is because the absolute value of the air-fuel ratio feedback correction value efaf becomes smaller than the threshold even if the properties of CNG have changed, when the processing of learning the air-fuel ratio learning value efgaf is executed prior to the processing of learning the inert gas concentration learning value eknco2 after the replenishment of filling CNG.

Besides, when the difference between the concentration of inert gas in filling CNG and the concentration of inert gas in residual CNG is small, or when the amount of filling CNG is smaller than the amount of residual CNG, the difference between the properties of mixed CNG and the properties of residual CNG may be small. Besides, the air-fuel ratio learning value efgaf is set for each of a plurality of operating regions that are separated from one another in accordance with the magnitude of the load or the like. Therefore, in some of the operating regions, the change in the properties of CNG may not be clearly reflected by the magnitude of the air-fuel ratio feedback correction value efaf.

Thus, when the absolute value of an average efgafave of the air-fuel ratio learning values efgaf in all the operating regions exceeds the threshold even in the case where the air-fuel ratio feedback correction value efaf does not exceed the threshold, the ECU 7 may regard the properties of CNG as having changed, and may update the inert gas concentration learning value eknco2. Concretely, the ECU 7 may add a predetermined value b to the inert gas concentration learning value eknco2 when the absolute value of the average efgafave is equal to or larger than the threshold. The predetermined value b is set to a positive value when the average efgafave is a positive value, and is set to a negative value when the average efgafave is a negative value. The magnitude of the absolute value of the predetermined value b may be a variable value that is determined in accordance with the magnitude of the absolute value of the average efgafave, or may be a fixed value that is determined through an adaptation processing that utilizes a preliminary experiment or the like. It should be noted, however, that the magnitude of the absolute value of the predetermined value b is set to a value smaller than the absolute value of the predetermined value a.

Besides, the threshold that is compared with the average efgafave is a value that is obtained by adding a margin to a maximum value that can be assumed by the absolute value of the average efgafave when the properties of CNG are constant. A threshold that is compared with the absolute value of the air-fuel ratio feedback correction value efaf will be referred to hereinafter as a first threshold, and a threshold that is compared with the absolute value of the average efgafave of the air-fuel ratio learning value efgaf will be referred to hereinafter as a second threshold.

When the inert gas concentration learning value eknco2 is updated under condition that the absolute value of the average efgafave be equal to or larger than the second threshold, the ECU 7 subtracts an update value (the predetermined value b) of the inert gas concentration learning value eknco2 from the air-fuel ratio learning value efgaf. On that occasion, the ECU 7 subtracts the update value of the inert gas concentration learning value eknco2 from the air-fuel ratio learning values efgaf for all the operating regions.

When the processing of learning the inert gas concentration learning value eknco2 is executed according to the method described above, the fuel injection amount (the fuel injection time) etau that is calculated according to the equation (1) becomes a value that can compensate for a change in the theoretical air-fuel ratio and a change in the Wobbe index that result from a change in the properties of CNG. As a result, in the case where the properties of CNG have changed, the air-fuel ratio of the mixture can be swiftly converged to the target air-fuel ratio, and the amount of the thermal energy that is generated when the mixture burns can be made coincident with a desired amount.

By the way, when CNG is used for the first time after the start of the internal combustion engine 1, the driver may operate the changeover button 10 (input a request for a changeover from CNG to another fuel) before the end of the determination as to whether or not the properties of CNG have changed or before the end of the learning processing.

Figure 3:
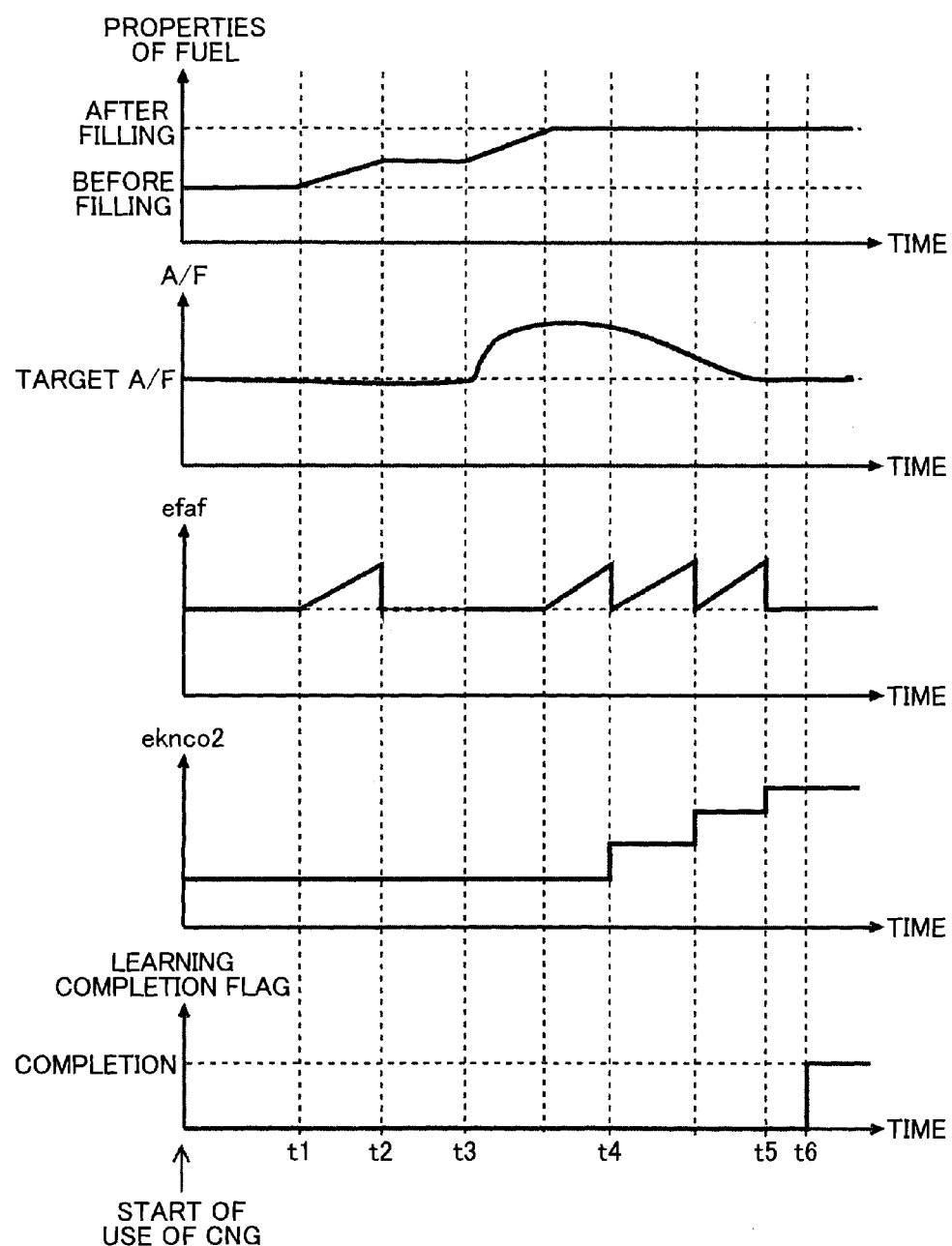
FIG. 3 includes timing charts showing how the air-fuel ratio (A/F) changes with time in the case where a changeover from CNG to another fuel is made before a learning processing ends.

It should be noted herein that FIG. 3 shows time-dependent changes in the properties of CNG, the air-fuel ratio (A/F), the air-fuel ratio, feedback correction value efaf, and the inert gas concentration learning value eknco2 in the case where a changeover from CNG to another fuel is made before the end of the learning processing and then a changeover from that fuel to CNG is made.

The properties of the CNG injected from the first fuel injection valves 5 are those before filling for a while (during a period to t1 in FIG. 3) from the time when CNG is used for the first time (the start of the use of CNG) after the start of the internal combustion engine 1. This is because pre-filling CNG remains in a route (the first fuel passage 51) from the first fuel tank 52 to the first fuel injection valves 5.

When the pre-filling CNG remaining in the first fuel passage 51 is consumed (at t1 in FIG. 3), the properties of the CNG injected from the first fuel injection valves 5 begin to change. In that case, the theoretical air-fuel ratio of the CNG injected from the first fuel injection valves 5 begins to change as well. However, the air-fuel ratio feedback correction value efaf is changed through air-fuel ratio feedback control, so the air-fuel ratio (A/F) approaches the target A/F. Besides, the magnitude of the air-fuel ratio feedback correction value efaf becomes larger than the first threshold. Therefore, it is determined that the properties of CNG have changed (it is determined that the learning processing needs to be executed), and the learning processing is started.

By the way, a changeover from CNG to another fuel is made before the end of the learning processing (at t2 in FIG. 3), the air-fuel ratio feedback correction value efaf is reset. Therefore, when a changeover from that fuel again to CNG is made (at t3 in FIG. 3), the air-fuel ratio (A/F) deviates from the target A/F. Then, when the air-fuel ratio feedback correction value efaf becomes larger than the first threshold, the update of the inert gas concentration learning value eknco2 (the learning processing) is started (at t4 in FIG. 3). Then, when the inert gas concentration learning value eknco2 becomes a value suited for the properties of post-filling CNG (at t5 in FIG. 3), the air-fuel ratio feedback correction value efaf becomes equal to or smaller than the first threshold, and the air-fuel ratio (A/F) converges to the target A/F. Then, the air-fuel ratio (A/F) stabilizes at a value close to the target A/F (at t6 in FIG. 3), a learning completion flag is turned on (completion).

As shown in FIG. 3, a deterioration in driveability or a deterioration in exhaust emission properties is caused if the air-fuel ratio (A/F) deviates from the target A/F when a changeover from that fuel again to CNG is made.

In contrast, according to the present embodiment of the invention, when CNG is used for the first time after the start of the internal combustion engine 1, a changeover from CNG to another fuel is prohibited from being made until it is determined that the properties of CNG have not changed, or until the learning processing ends. For example, as shown in FIG. 4, during a period from a time when CNG is used for the first time after the start of the internal combustion engine 1 (the start of the use of CNG) to a time when the learning completion flag is turned on (completion) (at t10 in FIG. 4), a changeover from CNG to another fuel is prohibited from being made, even when the driver operates the changeover button 10.

Incidentally, when the first fuel tank 52 is not filled with CNG before the start of the internal combustion engine 1 (during the stoppage of the operation of the internal combustion engine 1), or when the properties of filling CNG and the properties of residual CNg are substantially identical, the magnitude of the air-fuel ratio feedback correction value efaf is equal to or smaller than the first threshold, and the average efgafave of the air-fuel ratio learning value efgaf is equal to or smaller than the second threshold. In that case, there is no need to execute the learning processing. Therefore, the learning completion flag may be turned on as soon as it is determined that the air-fuel ratio feedback correction value efaf is equal to or smaller than the first threshold and that the average efgafave is equal to or smaller than the second threshold.

Besides, if the filling with (replenishment of) CNG is not carried out before the start of the internal combustion engine 1, the properties of CNG do not change. Therefore, the learning completion flag may be turned on as soon as CNG is used for the first time after the start of the internal combustion engine 1. In that case, a changeover to another fuel can be made immediately after the start of the use of CNG. Incidentally, as a method of determining whether or not the filling with CNG has been carried out before the start of the internal combustion engine 1, it is possible to employ a method that includes comparing a measured value of the pressure sensor 57 at the time of the last stoppage of operation (e.g., when the ignition switch is turned off) and a measured value of the pressure sensor 57 at the time of the current start (e.g., when the ignition switch is turned on) with each other, determining that the filling with CNG has not been carried out when the difference between the measured values is equal to or smaller than a predetermined value, and determining that the filling with CNG has been carried out when the difference between the measured values has exceeded the predetermined value.

A procedure of executing the learning processing in the present embodiment of the invention will be described hereinafter with reference to FIG. 5. FIG. 5 is a flowchart showing a processing routine that is executed by the ECU 7 when the internal combustion engine 1 is started (when the ignition switch is turned on). This processing routine is stored in advance in the ROM of the ECU 7. Incidentally, it is assumed that a fuel other than CNG is used when the internal combustion engine 1 is started.

In the processing routine of FIG. 5, the ECU 7 first determines in the process of S101 whether or not the filling with (replenishment of) CNG has been carried out before the start of the internal combustion engine 1. For example, when the difference between the measured value of the pressure sensor 57 at the time of the last stoppage of operation and the measured value of the pressure sensor 57 at the time of the current start is larger than a predetermined value, the ECU 7 determines that the filling with CNG has been carried out before the start of the internal combustion engine 1. On the other hand, when the difference is equal to or smaller than the predetermined value, the ECU 7 determines that the filling with CNG has not been carried out before the start of the internal combustion engine 1.

When the filling with CNG has not been carried out before the start of the internal combustion engine 1, the properties of CNG do not change, so there is no need to learn the properties of CNG. In consequence, when the result of the determination in step S101 is negative, the ECU 7 proceeds to the process of S109, and turns off (OFF) a prohibition flag. The prohibition flag is a flag that is turned on (ON) when a changeover from CNG to another fuel is prohibited from being made, and that is turned off (OFF) when a changeover from CNG to another fuel is permitted to be made. That is, as long as the prohibition flag is on (ON), a changeover from CNG to another fuel is prohibited from being made even when a request to make a changeover from CNG to another fuel is made (the driver operates the changeover button 10).

On the other hand, when the filling with CNG has been carried out before the start of the internal combustion engine 1, the properties of CNG may change, so there is a need to determine whether or not the learning processing needs to be executed (whether or not the properties of CNG have changed). In consequence, when the result of the determination in S101 is positive, the ECU 7 executes processes starting from S102.

In the process of S102, the ECU 7 determines whether or not a request to make a changeover from another fuel to CNG has been input. More specifically, the ECU 7 determines whether or not the changeover button 10 has been operated. When the result of the determination in the process of S102 is negative, the ECU 7 repeatedly executes the process of S102. On the other hand, when the result of the determination in the process of S102 is positive, the ECU 7 proceeds to the process of S103.

In the process of S103, the ECU 7 determines whether or not a condition of use of CNG is fulfilled. For example, when the A/F sensor 41 and the exhaust gas control apparatus 40 have been activated and the coolant temperature is equal to or higher than a predetermined temperature (e.g., a lowest coolant temperature at which it is determined that the internal combustion engine 1 has been warmed up), the ECU 7 determines that CNG can be used. When the result of the determination in the process of S103 is negative, the ECU 7 returns to the process of S102. On the other hand, when the result of the determination in S103 is positive, the ECU 7 proceeds to the process of S104.

In the process of S104, the ECU 7 changes over the fuel in use from another fuel to CNG. More specifically, the ECU 7 stops the second fuel injection valves 6 and the fuel pump 63. Furthermore, the ECU 7 opens the shutoff valve 55, and operates the first fuel injection valves 5. Subsequently, the ECU 7 proceeds to the process of S105, and turns on (ON) the prohibition flag.

In the process of S106, the ECU 7 determines whether or not a changeover from residual CNG to mixed CNG has been made. That is, the ECU 7 determines whether or not all the residual CNG remaining in the first fuel passage 51 has been consumed. Concretely, when the integrated amount of the CNG injected from the first fuel injection valves 5 becomes larger than the amount of the residual CNG remaining in the first fuel passage 51, the ECU 7 determines that all the residual CNG remaining in the first fuel passage 51 has been consumed. Incidentally, the amount of the residual CNG remaining in the first fuel passage 51 can be obtained based on the capacity of the first fuel passage 51. When the result of the determination in the process of S106 is negative, the ECU 7 repeatedly executes the process of S106. On the other hand, when the result of the determination in S106 is positive, the ECU 7 proceeds to the process of S107.

In the process of S107, the ECU 7 reads the air-fuel ratio feedback correction value efaf that is obtained through the air-fuel ratio feedback control that is executed according to the aforementioned method, and determines whether or not the magnitude (the absolute value) of the air-fuel ratio feedback correction value efaf is equal to or smaller than the first threshold. When the result of the determination in the process of S107 is positive, the ECU 7 proceeds to the process of S108.

In the process of S108, the ECU 7 obtains the average efgafave of the air-fuel ratio learning values efgaf obtained through air-fuel ratio feedback control, and determines whether or not the magnitude (the absolute value) of the average efgafave is equal to or smaller than the second threshold. When the result of the determination in the process of S108 is positive, the properties of filling CNG and the properties of CNG are substantially identical, so there is no need to execute the learning processing. In consequence, when the result of the determination in the process of S108 is positive, the ECU 7 proceeds to the process of S109, and turns off (OFF) the prohibition flag.

Besides, when the result of the determination in the process of S107 is negative, or when the result of the determination in the process of S108 is negative, the properties of filling CNG are different from the properties of residual CNG, so there is a need to execute the learning processing. In consequence, the ECU 7 proceeds to the process of S110, and executes the learning processing. Concretely, the ECU 7 first calculates the predetermined value a in accordance with the sign of the air-fuel ratio feedback correction value efaf and the magnitude of the absolute value of the air-fuel ratio feedback correction value efaf. Subsequently, the ECU 7 adds the predetermined value a to the inert gas concentration learning value eknco2, and sets a result of the calculation (=eknco2+a) as the new inert gas concentration learning value eknco2. Besides, the ECU 7 subtracts the predetermined value a from the air-fuel ratio feedback correction value efaf. Incidentally, the learning means of the invention is realized through the execution of the process of S110 by the ECU 7.

In the process of S111, it is determined whether or not the learning processing has ended. Concretely, when the air-fuel ratio feedback correction value efaf has decreased to or below the first threshold, the ECU 7 determines that the learning processing has ended. When the result of the determination in the process of S111 is negative, the ECU 7 returns to the process of S110. That is, the ECU 7 repeatedly executes the processes of S110 and S111 until the absolute value of the air-fuel ratio feedback correction value efaf becomes equal to or smaller than the first threshold. Then, when the absolute value of the air-fuel ratio feedback correction value efaf becomes equal to or smaller than the first threshold, the ECU 7 makes a positive determination in S111. In that case, the ECU 7 proceeds to the process of S109, and turns off (OFF) the prohibition flag.

When the learning processing is executed according to the aforementioned processing routine, a changeover from CNG to another fuel is prohibited from being made in a period from a time when CNG is used for the first time after the start of the internal combustion engine 1 to a time when it is determined that there is no need to execute the learning processing (in a period from the execution of the process of S104 to the making of a positive determination in the process of S108), or in a period from the time when CNG is used for the first time after the start of the internal combustion engine 1 to a time when the learning processing is completed (in a period from the execution of the process of S104 to the making of a positive determination in the process of S111).

As a result, a changeover from CNG to another fuel is made after it is determined that there is no need to execute the learning processing, or after the learning processing is completed. In consequence, when a changeover from CNG to another fuel is made and then a changeover from that fuel again to CNG is made, the air-fuel ratio of the mixture can be restrained from deviating from the air-fuel ratio suited for the properties of CNG. As a result, a deterioration in driveability or a deterioration in exhaust emission properties can be restrained from being caused as a result of a change in the properties of CNG.

Besides, when it is determined that the filling with CNG has not been carried out before the start of the internal combustion engine 1, the prohibition flag is turned off (OFF). Therefore, a changeover to another fuel can be made immediately after the use of CNG is started. Therefore, the period in which the fuel in use is restrained from being changed over against a request made by the driver can be shortened.

Incidentally, the determination means of the invention is realized through the execution of the process S101, S107 or S108 by the ECU 7. Besides, the prohibition means of the invention is realized through the execution of the processes of S105 and S109 by the ECU 7.

In the foregoing embodiment of the invention, the example in which the invention is applied to the internal combustion engine in which the fuel in use is changed over through the manual operation by the driver has been described. However, the invention can also be applied to an internal combustion engine in which the fuel in use is automatically changed over.

In an internal combustion engine that can use both CNG and liquid fuel, for example, as shown in FIG. 6, the CNG use region is set to a low load/low rotation operating region, and the liquid fuel use region is set to a high load/high rotation operating region. In this configuration, the fuel in use is automatically changed over when the operating state of the internal combustion engine shifts from the CNG use region to the liquid fuel use region, or when the operating state of the internal combustion engine shifts from the liquid fuel use region to the CNG use region.

By the way, the operating state of the internal combustion engine may shift from the CNG use region to the region for the use of liquid fuel before the end of the determination as to whether or not the properties of CNG have changed or before the end of the learning processing. If a changeover from CNG to liquid fuel is permitted in such a case, the same inconvenience as in the internal combustion engine in which the fuel in use is changed over through the manual operation by the driver is caused.

In consequence, it is appropriate to prohibit a changeover from CNG to liquid fuel from being made even if the operating state of the internal combustion engine shifts from the CNG use region to the liquid fuel use region in a period from a time when CNG is used for the first time after the start of the internal combustion engine to a time when it is determined that the properties of CNG have not changed (there is no need to execute the learning processing) or in a period from a time when CNG is used for the first time after the start of the internal combustion engine to a time when the learning processing ends.

The invention claimed is:

1. A control system for an internal combustion engine that can use a plurality of kinds of fuel including compressed natural gas, the control system comprising:
   an electronic control unit configured to:
   (i) determine whether or not properties of the compressed natural gas need to be learned;
   (ii) execute a learning processing when the electronic control unit determines that the properties of the compressed natural gas need to be learned, the learning processing being a processing of learning the properties of the compressed natural gas; and
   (iii) prohibit a changeover from the compressed natural gas to another fuel from being made before a first period or a second period ends, the first period being a period from a time when the compressed natural gas is used for a first time after start of the internal combustion engine to a time when the electronic control unit determines that the properties of the compressed natural gas do not need to be learned, and the second period being a period from the time when the compressed natural gas is used for the first time after the start of the internal combustion engine to a time when the learning processing that is executed after the electronic control unit determines that the properties of the compressed natural gas need to be learned is completed.

2. The control system according to claim 1, further comprising:
   an air-fuel ratio sensor that detects an air-fuel ratio of exhaust gas discharged from the internal combustion engine,
   wherein the electronic control unit is configured to execute feedback control of a fuel injection amount based on a difference between the air-fuel ratio detected by the air-fuel ratio sensor and a target air-fuel ratio, and
   the electronic control unit is configured to determine that the properties of the compressed natural gas do not need to be learned when a correction amount for the fuel injection amount through the feedback control is equal to or smaller than a threshold and the compressed natural gas is used for the first time after the start of the internal combustion engine, and
   the electronic control unit is configured to determine that the properties of the compressed natural gas need to be learned when the correction amount is larger than the threshold and the compressed natural gas is used for the first time after start of the internal combustion engine.

3. The control system according to claim 2, wherein
   the electronic control unit is configured to execute a processing of determining whether or not the compressed natural gas has been replenished before the start of the internal combustion engine, and
   the electronic control unit is configured to determine, based on the correction amount for the fuel injection amount through the feedback control, whether or not the properties of the compressed natural gas need to be learned, when the electronic control unit determines that the compressed natural gas has been replenished before the start of the internal combustion engine, and
   the electronic control unit is configured to determine that the properties of the compressed natural gas do not need to be learned when the electronic control unit determines that the compressed natural gas has not been replenished before the start of the internal combustion engine.

4. The control system according to claim 1, further comprising:
   an input device that allows a request for a changeover of the fuel used by the internal combustion engine to be input to the input device, wherein
   the electronic control unit is configured to prohibit the changeover of the fuel from being made until one of the first period and the second period ends, when the request for the changeover of the fuel is input to the input device during one of the first period and the second period.

5. A control method for an internal combustion engine that can use a plurality of kinds of fuel including compressed natural gas, the control method comprising:
   (i) determining whether or not properties of the compressed natural gas need to be learned;
   (ii) executing a learning processing when it is determined that the properties of the compressed natural gas need to be learned, the learning processing being a processing of learning the properties of the compressed natural gas; and
   (iii) prohibiting a changeover from the compressed natural gas to another fuel from being made before a first period or a second period ends, the first period being a period from a time when the compressed natural gas is used for a first time after start of the internal combustion engine to a time when it is determined that the properties of the compressed natural gas do not need to be learned, and the second period being a period from the time when the compressed natural gas is used for the first time after the start of the internal combustion engine to a time when the learning processing that is executed after it is determined that the properties of the compressed natural gas need to be learned is completed.

* * * * *